(12) United States Patent
Guo et al.

(10) Patent No.: US 10,791,875 B2
(45) Date of Patent: Oct. 6, 2020

(54) COFFEE BEAN GRINDING SYSTEM FOR COFFEE MACHINE

(71) Applicant: GUANGDONG XINBAO ELECTRICAL APPLIANCES HOLDINGS CO., LTD., Foshan, Guangdong (CN)

(72) Inventors: Jiangang Guo, Guangdong (CN); Lingdan Wen, Guangdong (CN)

(73) Assignee: GUANGDONG XINBAO ELECTRICAL APPLIANCES HOLDINGS CO., LTD. (CN)

( * ) Notice: Subject to any disclaimer, the term of this patent is extended or adjusted under 35 U.S.C. 154(b) by 253 days.

(21) Appl. No.: 15/755,867

(22) PCT Filed: Jun. 14, 2016

(86) PCT No.: PCT/CN2016/085708
§ 371 (c)(1),
(2) Date: Feb. 27, 2018

(87) PCT Pub. No.: WO2017/045449
PCT Pub. Date: Mar. 23, 2017

(65) Prior Publication Data
US 2018/0325320 A1    Nov. 15, 2018

(30) Foreign Application Priority Data

Sep. 15, 2015  (CN) .......................... 2015 1 0586514

(51) Int. Cl.
*A47J 42/46*     (2006.01)
*A47J 31/42*     (2006.01)
*A47J 42/02*     (2006.01)
*A47J 42/38*     (2006.01)

(52) U.S. Cl.
CPC ............... *A47J 42/46* (2013.01); *A47J 31/42* (2013.01); *A47J 42/02* (2013.01); *A47J 42/38* (2013.01)

(58) Field of Classification Search
CPC .. A47J 42/02; A47J 42/06; A47J 42/10; A47J 42/16; A47J 42/26; A47J 42/36; A47J 42/46
See application file for complete search history.

(56) References Cited

U.S. PATENT DOCUMENTS

| 5,865,384 A | * | 2/1999 | Pai ......................... | A47J 42/02 241/101.3 |
| 2004/0182958 A1 | * | 9/2004 | Herren .................... | A47J 42/08 241/169.1 |
| 2005/0279219 A1 | * | 12/2005 | Turi ....................... | A47J 31/42 99/286 |
| 2009/0084878 A1 | * | 4/2009 | Wang Wu ............... | A47J 42/04 241/169.1 |

(Continued)

*Primary Examiner* — Adam J Eiseman
*Assistant Examiner* — Stephen Floyd London

(57) ABSTRACT

A coffee bean grinding system for coffee machine comprising a coffee bean grinding box, a lower grinding blade assembly disposed within the coffee bean grinding box and a gear box, wherein the coffee bean grinding box further comprises a bottom wall, the lower grinding blade assembly further comprises a transmission joint disposed on the bottom wall, and the gear box further comprises an output shaft that is drivingly connected to the transmission joint; the transmission joint is movably connected to the output shaft.

9 Claims, 6 Drawing Sheets

(56) References Cited

U.S. PATENT DOCUMENTS

| | | | |
|---|---|---|---|
| 2009/0166455 A1* | 7/2009 | Pai .......................... | A47J 42/04 |
| | | | 241/93 |
| 2014/0224910 A1* | 8/2014 | Sahli ...................... | A47J 42/10 |
| | | | 241/246 |
| 2015/0157167 A1* | 6/2015 | Eicher .................... | A47J 42/06 |
| | | | 99/286 |
| 2016/0015214 A1* | 1/2016 | Lgdsgaard ............. | A47J 42/10 |
| | | | 241/259 |

* cited by examiner

COFFEE BEAN GRINDING SYSTEM FOR COFFEE MACHINE

TECHNICAL FIELD OF THE INVENTION

The present invention relates to the technical field of coffee machines, and more particularly, to a coffee bean grinding system for a coffee machine.

BACKGROUND OF THE INVENTION

Today coffee is an inseparable part of daily life. Making coffee generally comprises the following three steps: first, grinding coffee beans into coffee powder; second, feeding the coffee powder into a coffee box; third, pressing the coffee powder in the coffee box. Under normal conditions, coffee powder can be easily oxidized to give off its fragrance. Thus, a coffee bean grinding machine capable of automatically grinding coffee beans is developed for ordinary consumers.

Chinese patent CN103271655A discloses a coffee bean grinding system used for an automatic coffee machine. Such a coffee bean grinding system comprises a motor, a bevel gear, a lower grinding blade support, a lower grinding blade and an upper grinding blade. The output end of the motor is provided with a gear that is meshed with the bevel gear. The middle shaft of the bevel gear is engaged with the lower grinding blade support. The lower grinding blade is fixed on the lower grinding blade support, and the upper grinding blade is fixed on the upper grinding blade support. The lower grinding blade and the upper grinding blade are coaxially arranged.

Although the aforesaid grinding system enables the coffee beans to be automatically ground in a centrifugal state, it has the following shortcomings: first, as the upper grinding blade and the lower grinding blade are coaxially arranged, the lower grinding blade is fixed on the lower grinding blade support, and the lower grinding blade support is engaged with the middle shaft of the bevel gear. The bevel gear, the lower grinding blade support, the lower grinding blade and the upper grinding blade need to be simultaneously kept coaxial. However, during the process of assembling the bevel gear, the lower grinding blade support and the lower grinding blade, the lower grinding blade cannot be coaxial with the upper grinding blade if the bevel gear and the upper grinding blade are not coaxially assembled. Furthermore, as the bevel gear and the lower grinding blade are in one body, the upper grinding blade cannot be coaxial with the lower grinding blade once errors occur during the manufacturing or assembling process. As a result, the ground coffee powder has a low uniformity, leading to a bad mouthfeel of the brewed coffee.

SUMMARY OF THE INVENTION

As the bevel gear and the lower grinding blade are in one body in the prior art, the upper grinding blade cannot be coaxial with the lower grinding blade when there're errors in the assembly process. The purpose of the present invention is to solve the shortcomings in the prior art by providing a novel coffee bean grinding system for a coffee machine.

To achieve the above purpose, the present invention adopts the following technical solution:

A coffee bean grinding system for coffee machine comprising a coffee bean grinding box, a lower grinding blade assembly disposed within the coffee bean grinding box and a gear box, wherein the coffee bean grinding box further comprises a bottom wall, the lower grinding blade assembly further comprises a transmission joint disposed on the bottom wall, and the gear box further comprises an output shaft that is drivingly connected to the transmission joint, wherein the transmission joint is movably connected to the output shaft.

In another aspect of the present invention, the transmission joint is provided with a shaft hole, the output shaft is inserted into the shaft hole. The output shaft and the transmission joint are assembled via a plug-and-socket connecting method, achieving a quick assembly process and a convenient operation.

In another aspect of the present invention, the outer peripheral surface of the output shaft is provided with a protrusion extending along the axial direction of the output shaft. The shaft hole wall is provided with a groove that is matched with the protrusion. When assembling the gear box and the transmission joint of the lower grinding blade assembly, the output shaft is inserted into the shaft hole of the transmission joint, and this allows the protrusion to be engaged with the groove. The assembling process is simple and quick, achieving a stable connection between the output shaft and the transmission joint.

In another aspect of the present invention, the bottom wall is provided with a bearing, and the bearing is sleeved on the outer peripheral surface of the transmission joint. The bearing forms a support to the transmission joint, thereby ensuring the stability when the transmission joint rotates.

In another aspect of the present invention, the bottom wall is provided with a pressing ring used for pressing the bearing. The pressing ring is fixed to the bottom wall to press and limit the bearing, thereby preventing the bearing from being separated from the bearing housing.

In another aspect of the present invention, an inserting block is disposed at the top of the transmission joint. The lower grinding blade assembly further comprises a powder scraping piece, and an inserting groove matched with the inserting block is formed in the powder scraping piece. When the powder scraping piece is sleeved on the transmission joint, the inserting block of the transmission joint is inserted into the inserting groove of the powder scraping piece, enabling the transmission joint and the powder scraping piece to be connected. Thus, the transmission joint and the powder scraping piece can move synchronously.

In another aspect of the present invention, the lower grinding blade assembly further comprises a spiral head. The spiral head and the transmission joint are respectively disposed on two sides of the powder scraping piece. The spiral head is provided with a threaded hole. The powder scraping piece is provided with a first center hole that is coaxial with the threaded hole. The transmission joint is provided with a second center hole that is coaxial with the first center hole. After the screw sequentially passes through the second center hole and the first center hole, and is screwed into the threaded hole, the screw is capable of tightening the transmission joint and the spiral head. As a result, the transmission joint and the spiral head jointly clamp the lower grinding blade and the powder scraping piece, thereby completing the assembly of the lower grinding blade assembly. As the transmission joint, the powder scraping piece, the lower grinding blade and the spiral head can move synchronously, the stability of relative positions among various components during the operation can be maintained.

In another aspect of the present invention, the spiral head is provided with a die hole that is coaxial with the threaded hole, and a blocking portion used for separating the die hole and the threaded hole. The blocking portion is capable of preventing coffee beans form entering into the threaded hole while shielding the exposed screw. Thus, an aesthetic appearance of the spiral head can be achieved.

In another aspect of the present invention, a rubber plug used for blocking the die hole is disposed in the die hole. According to this design, coffee beans with the diameter smaller than that of the die hole can be prevented from entering into the die hole. Thus, coffee bean residue can be avoided from generating so that the coffee bean grinding system can be kept clean and sanitary in a long-term use.

In another aspect of the present invention, the lower grinding blade assembly further comprises a lower grinding blade disposed between the spiral head and the powder scraping piece. A connecting pin is disposed between the lower grinding blade and the powder scraping piece. After the connecting pin is installed in the pin holes, the lower grinding blade is connected to the powder scraping piece, thereby enabling the lower grinding blade to synchronously move with the powder scraping piece. The lower grinding blade and the powder scraping piece can be conveniently assembled.

Compared with the prior art, the present invention has the following advantages:

The gear box and the lower grinding blade assembly of the coffee bean grinding system for coffee machine form a separated-type structure. Therefore, the axis of the output shaft is not required to be completely overlapped with that of the transmission joint during the process of assembling the gear box and the lower grinding blade assembly. The transmission connection between the output shaft and the transmission joint can be achieved via a plug-and-socket connecting method. In such a configuration, even if the output shaft and the transmission joint are not coaxial, the output shaft does not affect the coaxiality among the transmission joint, the lower grinding blade and the upper grinding blade. Thus, a lower assembly precision between the output shaft and the lower grinding blade assembly is required, and the assembly errors between the output shaft and the transmission joint can be prevented from accumulating at the lower grinding blade, ensuring an unchanged space between the lower grinding blade and the upper grinding blade. Thus, after being ground by the upper grinding blade and the lower grinding blade, coffee powder with uniform particles can be obtained.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

In the drawings, the same reference numerals are used for the same parts, and the size of some parts may be exaggerated and not drawn on scale for illustrative purposes.

DETAILED DESCRIPTION OF THE INVENTION

Drawings and detailed embodiments are combined hereinafter to elaborate the technical principles of the present invention.

Figure 1:
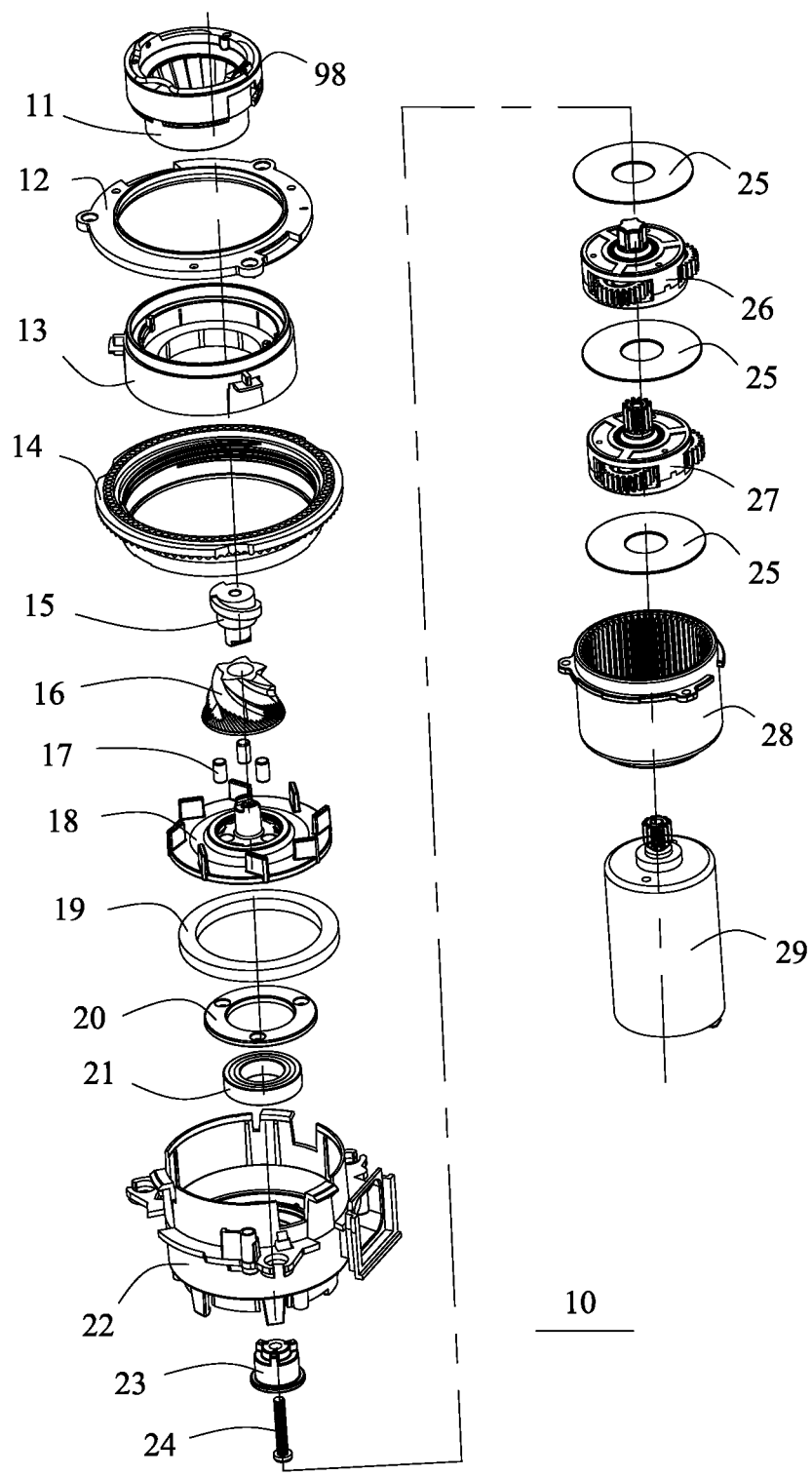
FIG. 1 is an explosive view of the coffee bean grinding system for coffee machine of the present invention.
Figure 2:
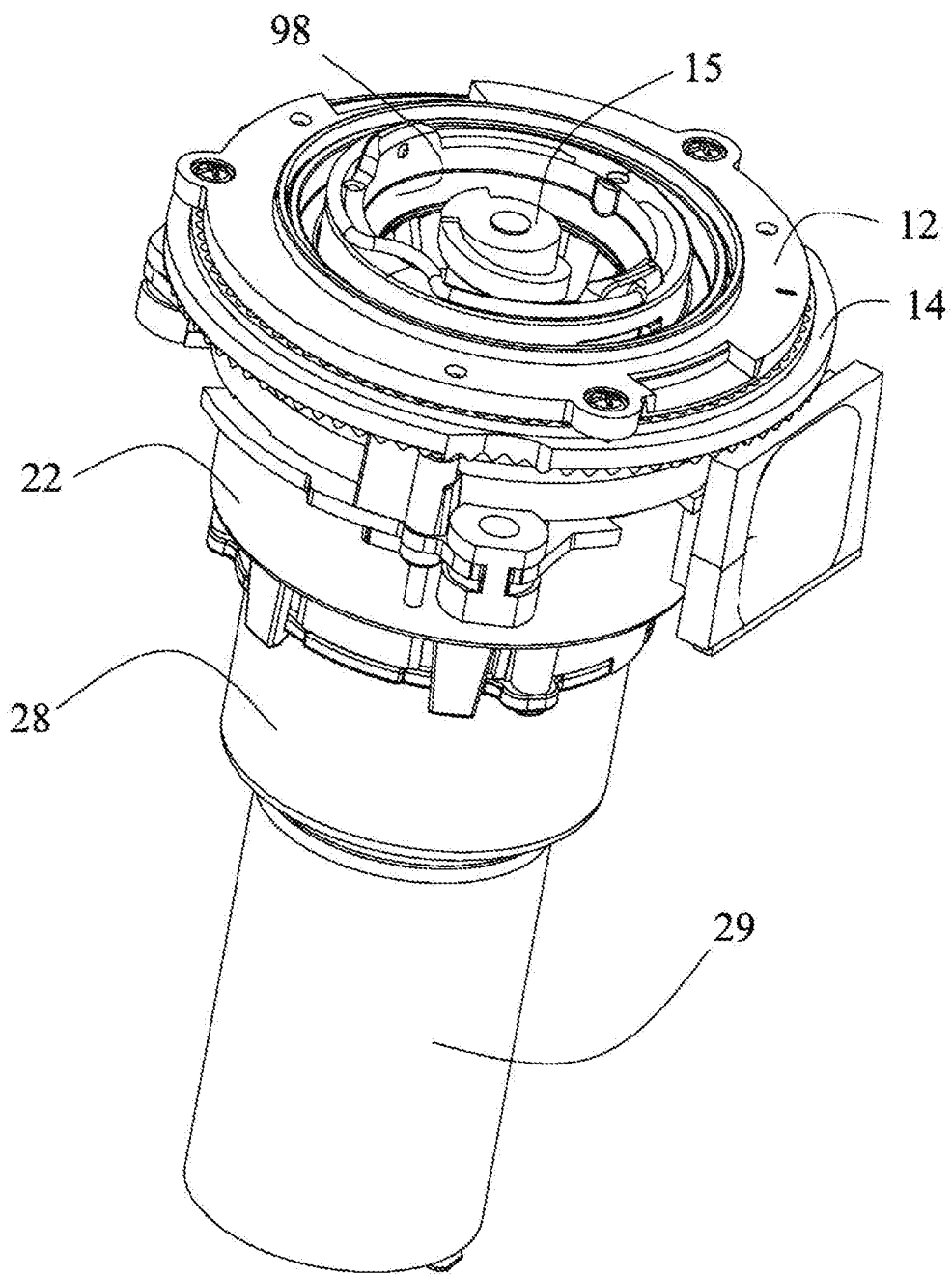
FIG. 2 is an assembly structural diagram of the coffee bean grinding system for coffee machine of the present invention.

As shown in FIGS. 1-2, the coffee bean grinding system 10 for a coffee machine of the present invention comprises a coffee bean grinding box 22, an upper grinding blade assembly that interacts with the coffee bean grinding box 22, a lower grinding blade assembly disposed within the coffee bean grinding box 22, a gear box and a motor 29.

Figure 6:
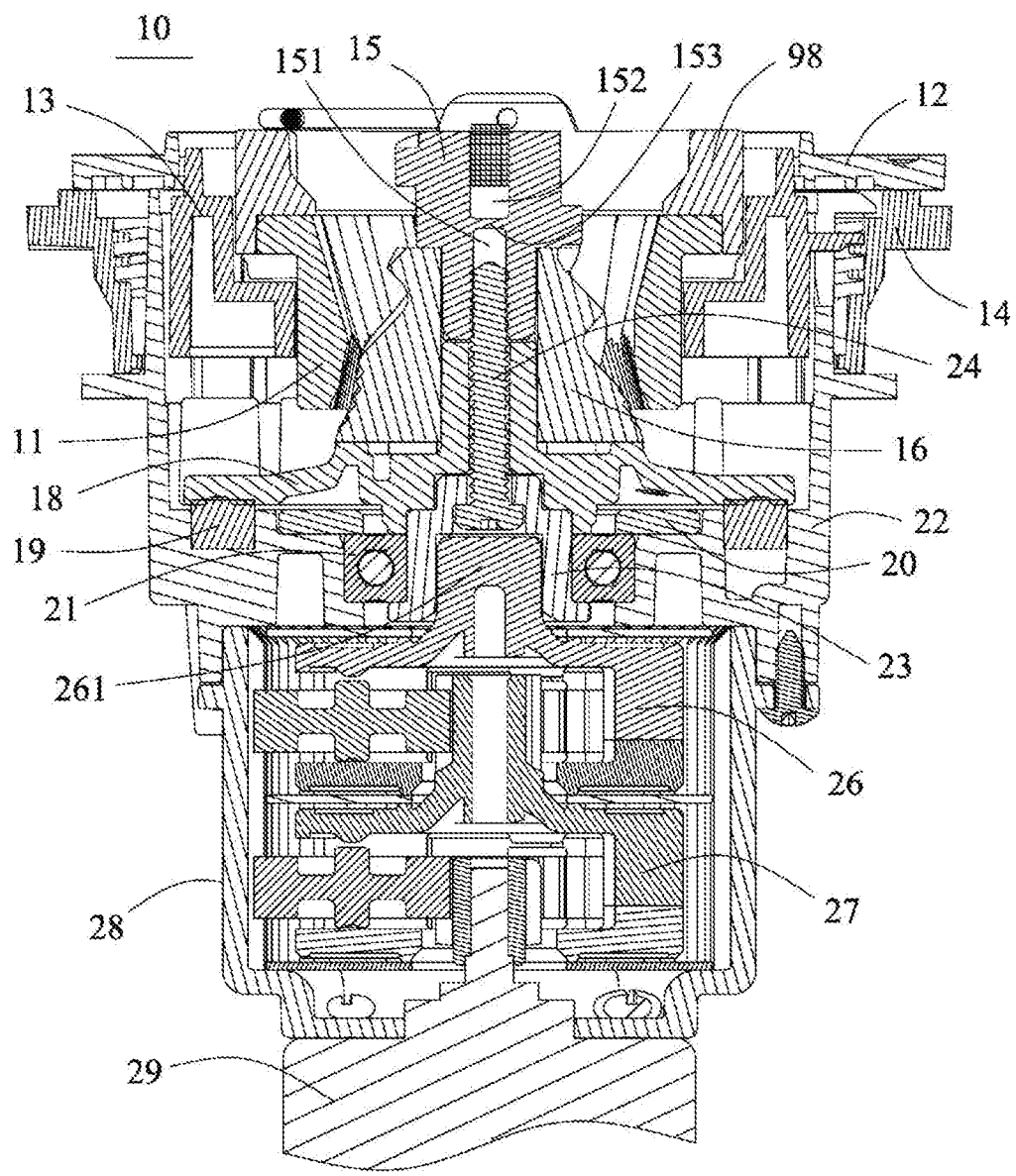
FIG. 6 is a sectional view of the coffee bean grinding system for coffee machine of the present invention.

The coffee bean grinding box 22 comprises a bottom wall and side walls. As shown in FIG. 6, a bearing housing is disposed on the bottom wall, and the bottom of the bearing housing is provided with an opening. A bearing 21 is disposed within the bearing housing. A pressing ring 20 is disposed on the outer side of the bearing 21. The pressing ring 20 is fixed to the bottom wall through screws. Thus, the bearing 21 is pressed and limited by the pressing ring 20, protecting the bearing 21 from being separated from the bearing housing.

As shown in FIGS. 1 and 6, the lower grinding blade assembly comprises a transmission joint 23 that is connected to the bearing 21, a powder scraping piece 18, a lower grinding blade 16 and a spiral head 15.

Figure 3:
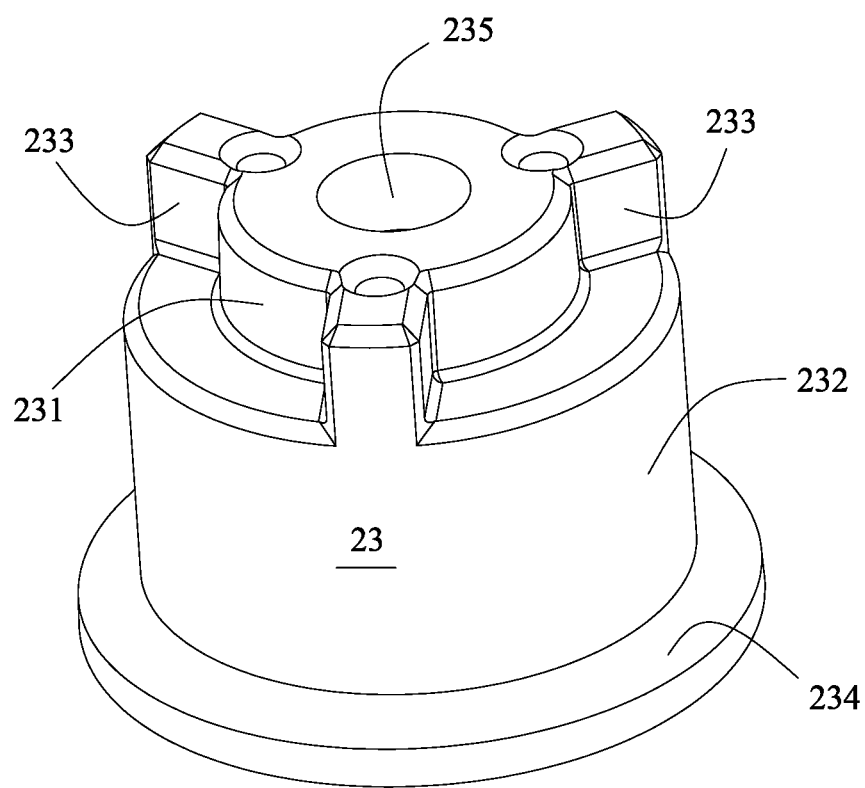
FIG. 3 is a structural diagram of the transmission joint of the present invention.
Figure 4:
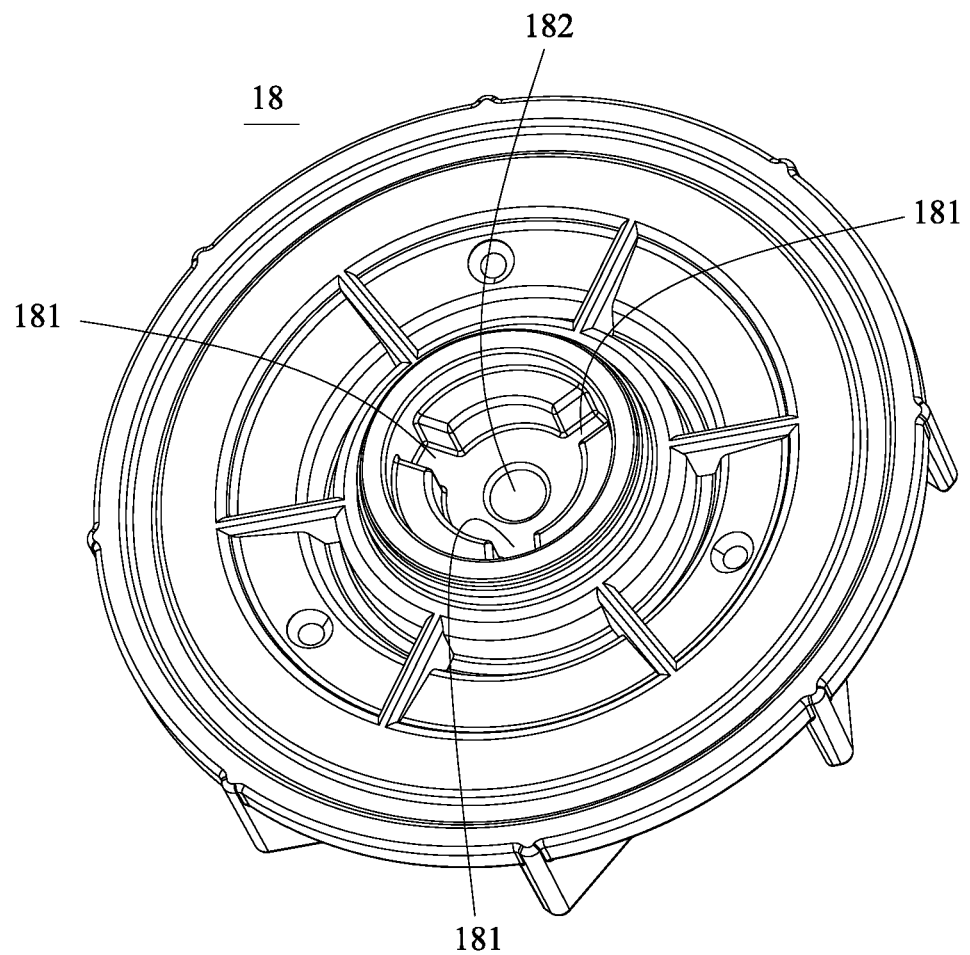
FIG. 4 is a structural diagram of the powder scraping piece of the present invention.

The transmission joint 23 penetrates through the opening in the bottom of the bearing housing, and is inserted into the inner ring of the bearing 21. In the embodiment of the present invention, as shown in FIG. 3, the transmission joint 23 comprises a first step shaft 231 and a second step shaft 232. The second step shaft 232 is matched with the inner ring of the bearing 21. The transmission joint 23 comprises an inserting block 233 extending from a step surface between the first step shaft 231 and the second step shaft 232 along the axial direction of the first step shaft 231. Preferably, three inserting blocks 233 are evenly disposed around the axis of the first step shaft 231. An annular flange 234 is provided on the outer peripheral surface of the end portion of the second step shaft 232. The bearing 21 is sleeved on the outer peripheral surface of the second step shaft 232 of the transmission joint 23. The edge of the annular flange 234 abuts against the inner ring of the bearing 21, thereby preventing the transmission joint 23 from axially moving along the bearing 21. The powder scraping piece 18 comprises a step hole that is matched with the first step shaft 231 and the second step shaft 232. As shown in FIG. 4, the surface of one side of the powder scraping piece 18 that faces towards the transmission joint 23 is provided with an inserting groove 181 that corresponds to the inserting block 233. When the powder scraping piece 18 is sleeved on the transmission joint 23, the inserting block 233 of the transmission joint 23 is inserted into the inserting groove 181 of the powder scraping piece 18, thereby achieving a connection between the transmission joint 23 and the powder scraping piece 18. Thus, the transmission joint 23 and the powder scraping piece 18 can move synchronously. The end surface of the powder scraping piece 18 that faces towards the transmission joint 23 abuts against the inner ring of the bearing 21, thereby further limiting the bearing 21. A wool ring 19 is disposed between the powder scraping piece 18 and the bottom wall of the coffee bean grinding box 22. Thus, a space formed between the powder scraping piece 18 and the bottom wall of the coffee bean grinding box 22 is filled by the wool ring 19, preventing the coffee powder from entering into the aforesaid space.

The surface of the powder scraping piece 18 that is disposed back to the transmission joint 23 is provided with a convex column. A center hole that is matched with the convex column is formed on the lower grinding blade 16. Thus, after the lower grinding blade 16 is sleeved on the convex column of the powder scraping piece 18, the lower grinding blade 16 can be positioned. The lower grinding blade 16 and the transmission joint 23 are respectively disposed on two sides of the powder scraping piece 18. Pin holes are formed in the opposite surfaces of the lower grinding blade 16 and the powder scraping piece 18. After the connecting pin 17 is installed in the pin holes, the lower grinding blade 16 is connected to the powder scraping piece 18, thereby enabling the lower grinding blade 16 to synchronously move with the powder scraping piece 18.

The spiral head 15 comprises an insertion section that is inserted into the center hole of the lower grinding blade 16 and a pressing section that abuts against the end surface of the lower grinding blade 16. An engaging groove is formed in the top of the convex column of the powder scraping piece 18, and an engaging portion that can be engaged with the engaging groove is disposed at the top of the insertion section of the spiral head 15. Thus, the spiral head 15 and the powder scraping piece 18 can synchronously move through the aforesaid engagement.

As shown in FIG. 6, the insertion section is provided with a threaded hole 151 that faces towards the convex column of the powder scraping piece 18. The pressing section is provided with a die hole 152 that is coaxial with the threaded hole 151. Preferably, a blocking portion 153 (shown in FIG. 6) used for separating the die hole 152 and the threaded hole 151 is disposed between the die hole 152 and the threaded hole 151. The blocking portion 153 is capable of preventing coffee beans form entering into the threaded hole 151 while shielding the exposed screw. Thus, an aesthetic appearance of the spiral head 15 can be achieved. Further, as shown in FIGS. 2 and 6, a rubber plug used for blocking the die hole 152 is disposed in the die hole 152. According to this design, coffee beans with the diameter smaller than that of the die hole 152 can be prevented from entering into the die hole 152. Thus, coffee bean residue can be avoided from generating so that the coffee bean grinding system can be kept clean and sanitary in a long-term use.

As shown in FIG. 4, the powder scraping piece 18 is provided with a first center hole 182 that is opposite to and coaxial with the threaded hole 151 of the spiral head 15. As shown in FIG. 3, the transmission joint 23 is provided with a second center hole 235 that is coaxial with the first center hole 182. As shown in FIG. 6, after the screw 24 sequentially passes through the second center hole 235 and the first center hole 182 and is screwed into the threaded hole 151, the screw 24 is capable of tensioning the transmission joint 23 and the spiral head 15. As a result, the transmission joint 23 and the spiral head 15 jointly clamp the lower grinding blade 16 and the powder scraping piece 18. At this moment, the lower grinding blade assembly is completely assembled. As the transmission joint 23, the powder scraping piece 18, the lower grinding blade 16 and the spiral head 15 can move synchronously, the stability of relative positions among various components during the operation can be maintained.

The upper grinding blade assembly comprises an upper grinding blade 11 that is coaxial with the lower grinding blade 16, an grinding blade support 13 used for supporting the upper grinding blade 11, a fixing member 98 used for pressing the upper grinding blade 11 against the grinding blade support 13, an adjusting wheel 14 used for supporting the grinding blade support 13, and an adjusting wheel cover 12 matched with the adjusting wheel 14. When the adjusting wheel 14 is rotated, the adjusting wheel 14 can move to adjust the position of the grinding blade support 13. The grinding blade support 13 propels the upper grinding blade 11 to move, thereby adjusting the distance between the upper grinding blade 11 and the lower grinding blade 16. Thus, according to the coffee bean grinding system of the present invention, coffee powder with various particle sizes can be achieved. A higher coaxiality of the upper grinding blade 11 and the lower grinding blade 16 can achieve a higher uniformity of the coffee powder particles. Coffee powder with uniform particles has an attractive appearance, can be brewed into tasty and delicious coffee.

The gear box comprises a gear case 28, a lower planetary gear group 27 disposed within the gear case 28, an upper planetary gear group 26 that is in transmission connection with the lower planetary gear group 26. Gaskets 25 are respectively disposed between the gear case 28 and the lower planetary gear group 27, the lower planetary gear group 27 and the upper planetary gear group 26, and disposed on the outer side of the upper planetary gear group 26. The motor 29 is drivingly connected to the lower planetary gear group 27, thereby inputting power into the gear box. The output shaft 261 of the upper planetary gear group 26 is the output shaft of the gear box. The output shaft of the gear box is drivingly connected to the transmission joint 23, thereby transferring the power of the motor 29 to the lower grinding blade 16 through the transmission joint 23. Thus, the lower grinding blade 16 can be propelled to rotate.

Figure 5:
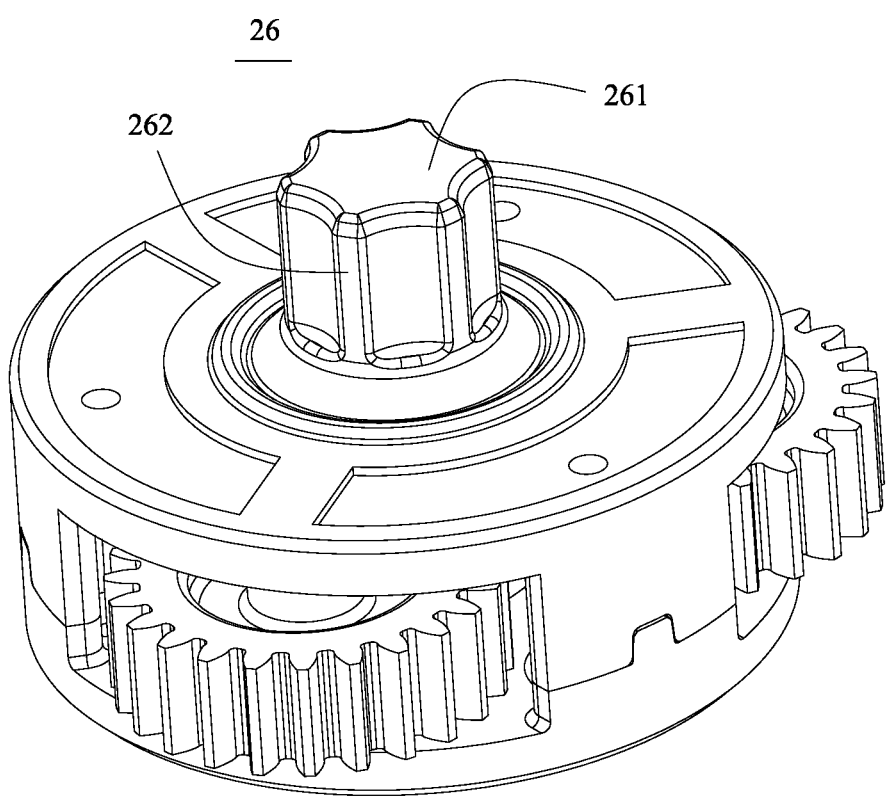
FIG. 5 is a structural diagram of the upper planetary gear group of the present invention.

The transmission joint 23 is provided with a shaft hole for receiving the output shaft 261 (shown in FIG. 5) of the upper planetary gear group 26. The outer peripheral surface of the output shaft 261 is provided with a protrusion 262 (shown in FIG. 5) extending along the axial direction of the output shaft 261. The shaft hole wall is provided with a groove that is matched with the protrusion 262, and extends along the axial direction of the shaft hole. When assembling the gear box and the transmission joint 23 of the lower grinding blade assembly, the output shaft 261 is inserted into the shaft hole of the transmission joint 23, and this allows the protrusion 262 to be engaged with the groove. The assembling process is simple and quick, achieving a stable connection between the output shaft and the transmission joint 23. The output shaft 261 can propel the transmission joint 23 to synchronously rotate with the output shaft 261, and the output shaft 261 can synchronously propel the lower grinding blade 16 to rotate through the transmission joint 23. The rotating lower grinding blade 16 and the stationary upper grinding blade 11 interact with each other to grind the coffee beans.

Preferably, the output shaft 261 and the shaft hole are in spline fit. Such a design is capable of improving the connection stability of the output shaft 261 and the transmission joint 23. Thus, the stability of the output shaft 261 and the transmission joint 23 during the power transferring process can be further ensured.

Moreover, the end surface of the output shaft is provided with a convex block, and a groove matched with the convex block is formed in the bottom wall of the shaft hole. When the output shaft 261 is inserted into the shaft hole, the convex block is inserted into the groove, enabling the output shaft 261 to be drivingly connected to the transmission joint 23.

The gear box and the lower grinding blade assembly of the coffee bean grinding system 10 form a separated-type structure. After being separately assembled, the gear box and the lower grinding blade assembly are assembled together. First, when assembling the lower grinding blade assembly, the transmission joint 23 and the lower grinding blade 16 are coaxially arranged. Subsequently, when assembling the upper grinding blade assembly, the upper grinding blade 11 and the lower grinding blade 16 are coaxially arranged. Thus, the distance between the upper grinding blade 11 and the lower grinding blade 16 is ensured to be equal. Finally, the output shaft 261 is directly inserted into the transmission joint 23, and the gear case 28 is fixed with the coffee bean grinding box 22.

Due to the separated-type structure of the gear box and the lower grinding blade assembly, the axis of the output shaft 261 is not required to be completely overlapped with that of the transmission joint 23 during the process of assembling the gear box and the lower grinding blade assembly. The transmission connection between the output shaft 261 and the transmission joint 23 can be achieved via a plug-and-socket connecting method. In such a configuration, even if the output shaft 261 and the transmission joint 23 are not coaxial, the output shaft 261 does not affect the coaxiality among the transmission joint 23, the lower grinding blade 16 and the upper grinding blade 11. Thus, a lower assembly precision between the output shaft 261 and the lower grinding blade assembly is required, and the assembly errors between the output shaft 261 and the transmission joint 23 can be prevented from accumulating at the lower grinding blade 16, ensuring an unchanged space between the lower grinding blade 16 and the upper grinding blade 11. Thus, after being ground by the upper grinding blade 11 and the lower grinding blade 16, coffee powder with uniform particles can be obtained.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A coffee bean grinding system for a coffee machine, comprising: a coffee bean grinding box, and a gear box, wherein the coffee bean grinding box further comprising a bottom wall and a side wall, wherein a bearing housing is disposed on the bottom wall, and the bottom of the bearing housing is provided with an opening, a bearing disposed within the bearing housing, a transmission joint connected to the bearing, a powder scraping piece, a lower grinding blade, and a spiral head, and a pressing ring disposed on an outer side of the bearing, and a wool ring disposed between the powder scraping piece and the bottom wall of the coffee bean grinding box, wherein the pressing ring is fixed to the bottom wall to secure the bearing to the bearing housing, wherein the transmission joint penetrates through the opening in the bearing housing and inserted into an inner ring of the bearing, wherein the transmission joint further comprising a first step shaft, a second step shaft, three inserting blocks extending from a step surface between the first step shaft and the second step shaft along an axial direction of the first step shaft, wherein the three inserting blocks are evenly disposed around the first step shaft, wherein an annular flange is provided on an outer peripheral surface of an end portion of the second step shaft, wherein the annular flange prevents the transmission joint from axially moving along the bearing, wherein the powder scraping piece further comprising a step hole corresponding to the first step shaft and the second step shaft, wherein a surface of the powder scraping piece is provided with an inserting groove corresponding to the inserting block, wherein an inserting block of the three inserting blocks of the transmission joint is inserted into the inserting groove causing the transmission joint and the powder scraping piece to move synchronously.

2. The coffee bean grinding system for a coffee machine of claim 1, wherein the transmission joint is provided with a shaft hole, and an output shaft inserted into the shaft hole.

3. The coffee bean grinding system for a coffee machine of claim 2, wherein an outer peripheral surface of the output shaft is provided with a protrusion extending along an axial direction of the output shaft.

4. The coffee bean grinding system for coffee machine of claim 1, wherein the powder scraping piece further comprising a convex column, wherein a center hole is formed on the lower grinding blade, wherein the lower grinding piece and the transmission joint are respectively disposed on two sides of the powder scraping piece, wherein pin holes are formed on opposite surfaces of the lower grinding blade and the powder scraping piece, a connecting pin is installed in the pin holes causing the lower grinding blade to move synchronously with the powder scraping piece.

5. The coffee bean grinding system for coffee machine of claim 4, wherein the spiral head further comprising an insert section inserted into the center hole of the lower grinding blade and a pressing section abuts against an end surface of the lower grinding blade, an engaging groove formed in the top of the convex column of the powder scraping piece, and an engaging portion corresponding to the engaging groove.

6. The coffee bean grinding system for coffee machine of claim 5, wherein the spiral head is provided with a threaded hole, wherein the powder scraping piece is provided with a first center hole that is coaxial with the threaded hole, wherein the transmission joint is provided with a second center hole that is coaxial with the first center hole.

7. The coffee bean grinding system for coffee machine of claim 6, wherein the spiral head is provided with a die hole that is coaxial with the threaded hole, and a blocking portion used for separating the die hole and the threaded hole, wherein the blocking portion is capable of preventing coffee beans from entering into the threaded hole and shielding exposed screws, wherein a rubber plug is disposed in the die hole.

8. The coffee bean grinding system for coffee machine of claim 7, wherein the gear box further comprising a gear case, a lower planetary gear group disposed within the gear case, and an upper planetary gear group connected to the lower planetary gear group, a gasket respectively disposed between the gear case and the lower planetary gear group, wherein a motor is drivingly connected to the lower planetary gear group.

9. The coffee bean grinding system for coffee machine of claim 6, the lower grinding blade disposed between the spiral head and the powder scraping piece, wherein the connecting pin is disposed between the lower grinding blade and the powder scraping piece.

* * * * *